(12) United States Patent
Mason (10) Patent No.: US 6,408,279 B1
(45) Date of Patent: Jun. 18, 2002

(54) METHOD AND APPARATUS FOR OPERATING A SELF-SERVICE CHECKOUT TERMINAL AND A REMOTE SUPERVISOR TERMINAL OF A RETAIL SYSTEM

(75) Inventor: Timothy E. Mason, Buford, GA (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/340,523

(22) Filed: Jun. 28, 1999

(51) Int. Cl.⁷ .............................................. G06F 17/60
(52) U.S. Cl. ........................... 705/16; 705/21; 235/383
(58) Field of Search ..................... 705/16–23; 235/303, 235/467; 186/36, 37, 59–64, 66

(56) References Cited

U.S. PATENT DOCUMENTS

| | | |
|---|---|---|
| 4,276,598 A | 6/1981 | Inoue et al. |
| 4,408,292 A | 10/1983 | Nakatani et al. |
| 4,484,277 A | 11/1984 | Uesugi |
| 4,502,120 A | 2/1985 | Ohnishi et al. |
| 4,713,760 A | 12/1987 | Yamada et al. |
| 4,729,097 A | 3/1988 | Takaoka et al. |
| 4,771,382 A | 9/1988 | Shiono et al. |
| 4,843,547 A | 6/1989 | Fuyama et al. |
| 4,964,053 A * | 10/1990 | Humble ........................ 705/21 |
| 5,189,607 A | 2/1993 | Shirasaki et al. |
| 5,253,163 A | 10/1993 | Yoshida |
| 5,752,582 A | 5/1998 | Hayward |
| 5,758,326 A | 5/1998 | Ishikawa |
| 5,794,214 A | 8/1998 | Ebina et al. |
| 6,032,128 A * | 2/2000 | Morrison et al. ............. 705/23 |
| 6,047,262 A * | 4/2000 | Lutz ............................ 705/16 |
| 6,167,381 A * | 12/2000 | Swain et al. ................... 705/17 |

FOREIGN PATENT DOCUMENTS

DE 2731127 * 1/1978 ................... 705/17

OTHER PUBLICATIONS

IBM Technical Disclosure Bulletin, vol. 18, No. 8, Jan. 1976, "Point–of–Sale Terminal System with Clerical Facilities/Functions".*
"Commercial Applicances on Review", Richard Dzierwa, Appliance, v46, n7, p72, Jul. 1989.*
Web Pages: http://www.pscnet.com/uscanspe.htm. 1998.*

* cited by examiner

Primary Examiner—Richard Chilcot
(74) Attorney, Agent, or Firm—Maginot, Addison & Moore (57) ABSTRACT

A method of operating a retail system which has (i) a self-service checkout terminal, and (ii) a remote supervisor terminal includes the step of generating an intervention-needed control signal with the self-service checkout terminal if a user of the self-service checkout terminal requests intervention from retail personnel operating the remote supervisor terminal during a checkout transaction. The method also includes the step of transmitting the intervention-needed control signal to the remote supervisor terminal. The method further includes the step of generating a request-acknowledged control signal with the remote supervisor terminal in response to receipt of the intervention-needed control signal. Moreover, the method includes the step of suspending the checkout transaction of the user in response to generation of the request-acknowledged control signal. A self-service retail system is also disclosed.

24 Claims, 4 Drawing Sheets

METHOD AND APPARATUS FOR OPERATING A SELF-SERVICE CHECKOUT TERMINAL AND A REMOTE SUPERVISOR TERMINAL OF A RETAIL SYSTEM

TECHNICAL FIELD OF THE INVENTION

The present invention relates generally to a retail system, and more particularly to a method and apparatus for operating a self-service checkout terminal and a remote supervisor terminal of a retail system.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer without the aid of a checkout clerk. In such a system, the customer scans individual items for purchase across a scanner and then places the scanned item into a grocery bag, if desired. The customer then pays for his or her purchase either at the self-service checkout terminal if so equipped, or at a central payment area such as a remote supervisor terminal or payment terminal which is staffed by a store employee. Thus, a self-service checkout terminal permits a customer to select, itemize, and in some cases pay for his or her items for purchase without the assistance of the retailer's personnel.

However, in certain circumstances it is necessary for retail personnel to intervene in order to complete the customer's transaction during operation of the self-service checkout terminal. Such intervention is typically performed by the store employee (e.g. a retail clerk) that is operating the remote supervisor terminal. Examples of situations which require intervention by the store employee operating the remote supervisor terminal include (1) collection of coupons, (2) acceptance of tendered checks, (3) handling of credit card verification exceptions, and (4) itemization (i.e. entry) of items that the customer is unable to scan or otherwise enter.

In order to provide for such intervention, the customer's transaction may be halted at the self-service checkout terminal thereby allowing the customer to complete his or her transaction at the remote supervisor terminal. In particular, operation of the self-service checkout terminal is halted thereby allowing the customer to take his or her items for purchase the remote supervisor terminal where the store employee operating the remote supervisor terminal assists the customer in the completion of his or her transaction.

Such operation of a retail system has a number of drawbacks associated therewith. For example, once the customer's transaction has been halted at the self-service checkout terminal, the customer may intentionally or inadvertently exit the retailer's store without tendering payment for his or her items for purchase. Moreover, a relatively long queue of customers may form at the remote supervisor terminal thereby causing the store employee operating the remote supervisor terminal to undesirably experience difficulty in matching each of the customers present in the queue with their respective unfinished checkout transactions.

What is needed therefore is a retail system which overcomes one or more of the above-mentioned drawbacks. What is particularly needed is a method and apparatus for operating a retail system which reduces the number of occasions in which a customer intentionally or accidentally exits the store without tendering payment for his or her items for purchase. What is also needed is a method and apparatus for operating a retail system which allows the store employee operating the remote supervisor terminal to quickly and accurately complete the respective checkout transaction associated with each customer which requires intervention.

SUMMARY OF THE INVENTION

In accordance with a first embodiment of the present invention, there is provided a method of operating a retail system which includes (i) a self-service checkout terminal, and (ii) a remote supervisor terminal. The method includes the step of generating an intervention-needed control signal with the self-service checkout terminal if a user of the self-service checkout terminal requests intervention from retail personnel operating the remote supervisor terminal during a checkout transaction. The method also includes the step of transmitting the intervention-needed control signal to the remote supervisor terminal. The method further includes the step of generating a request-acknowledged control signal with the remote supervisor terminal in response to receipt of the intervention-needed control signal. Moreover, the method includes the step of suspending the checkout transaction of the user in response to generation of the request-acknowledged control signal.

In accordance with a second embodiment of the present invention, there is provided a self-service retail system. The retail system includes a self-service checkout terminal for allowing a user to checkout items for purchase during a checkout transaction. The retail system also includes a remote supervisor terminal electrically coupled to the self-service checkout terminal. The self-service checkout terminal is configured to (a) generate an intervention-needed control signal if the user requests intervention from retail personnel operating the remote supervisor terminal during the checkout transaction, and (b) transmit the intervention-needed control signal to the remote supervisor terminal. The remote supervisor terminal is configured to (a) generate a request-acknowledged control signal in response to receipt of the intervention-needed control signal, and (b) cause the checkout transaction of the user to be suspended in response to generation of the request-acknowledged control signal.

In accordance with a third embodiment of the present invention, there is provided a method of operating a retail system which includes a self-service checkout terminal and a remote supervisor terminal. The method includes the step of generating an intervention-needed control signal with the self-service checkout terminal if a user of the self-service checkout terminal inputs a first code in a first input device associated with the self-service checkout terminal which indicates that the user requests intervention from retail personnel operating the remote supervisor terminal during a checkout transaction. The method also includes the step of transmitting the intervention-needed control signal to the remote supervisor terminal. The method further includes the step of generating a first message which informs the retail personnel operating the remote supervisor terminal that the user of the self-service checkout terminal requests intervention in response to receipt of the intervention-needed control signal. Moreover, the method includes the step of generating a request-acknowledged control signal with the remote supervisor terminal if the retail personnel operating the remote supervisor terminal inputs a second code in a second input device associated with the remote supervisor terminal which indicates that the retail personnel desires for the user to complete the checkout transaction of the user at the remote supervisor terminal. Yet further, the method includes the step of suspending the checkout transaction of the user in response to generation of the request-acknowledged control signal.

In accordance with a fourth embodiment of the present invention, there is provided a method of operating a retail system which includes (i) a self-service checkout terminal, and (ii) a remote supervisor terminal. The method includes the step of generating an intervention-needed control signal with the self-service checkout terminal if a user of the self-service checkout terminal requires intervention from retail personnel operating the remote supervisor terminal during a checkout transaction. The method also includes the step of transmitting the intervention-needed control signal to the remote supervisor terminal. The method further includes the step of generating a request-acknowledged control signal with the remote supervisor terminal in response to receipt of the intervention-needed control signal. Moreover, the method includes the step of suspending the checkout transaction of the user in response to generation of the request-acknowledged control signal.

It is therefore an object of the present invention to provide a new and useful method and apparatus of operating a self-service retail system.

It is moreover an object of the present invention to provide an improved method and apparatus for operating a self-service retail system.

It is yet further an object of the present invention to provide a method and apparatus for operating a retail system which reduces the number of occasions in which a customer intentionally or inadvertently exits the store without paying for his or her items for purchase.

Moreover, it is an object of the present invention to provide a method and apparatus for operating a retail system which allows the store employee operating the remote supervisor terminal to quickly and accurately complete the respective checkout transaction associated with each customer which requires intervention.

The above and other objects, features, and advantages of the present invention will become apparent from the following description and the attached drawings.

DETAILED DESCRIPTION OF THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
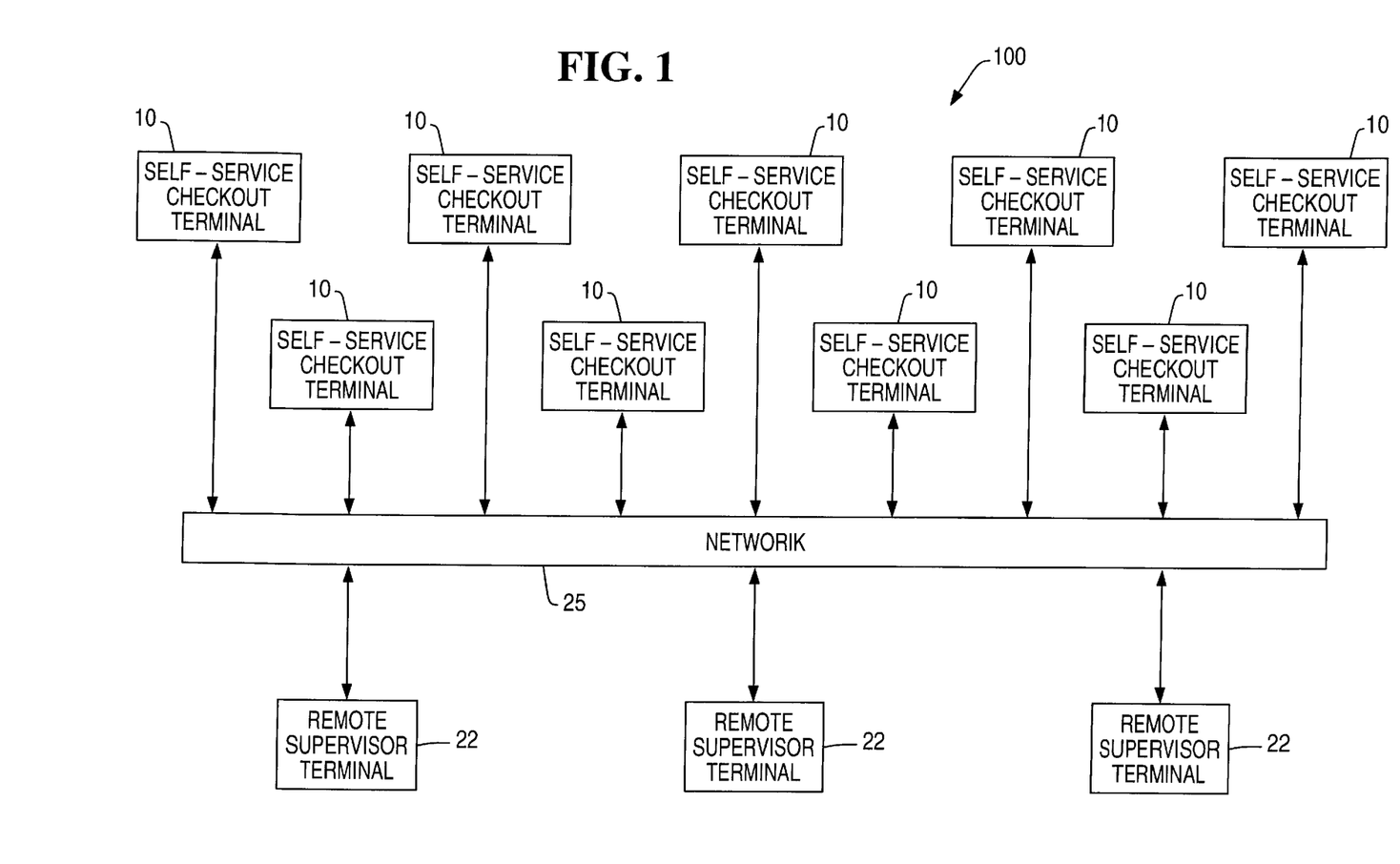
FIG. 1 is a simplified block diagram of a self-service retail system which incorporates the features of the present invention therein.

Referring now to FIG. 1, there is shown a self-service retail system 100 for use in a retail business such as a grocery store. The self-service retail system 100 includes a number of self-service checkout terminals 10 and a number of remote supervisor terminals 22. Each of the self-service checkout terminals 10 is electrically coupled to each of the remote supervisor terminals 22 via a network 25 such as a LAN or WAN. The self-service checkout terminals 10 communicate with components coupled to the retailer's network 25 such as data servers and the like during a checkout procedure in order to obtain information, such as pricing information, associated with an item being scanned or otherwise entered, and also to verify customer credit approval when appropriate.

Moreover, the remote supervisor terminals 22 communicate with the self-service checkout terminals 10 via the retailer's network 25 in order to monitor operation of the self-service checkout terminals 10 by the customers operating each of the respective checkout terminals. What is meant herein by the terms "monitor operation" or "monitors operation" is that one of the remote supervisor terminals 22 is in communication with the self-service checkout terminal 10 so as to perform supervisory functions that facilitate proper operation of the self-service checkout terminals 10 by the customer. Examples of such supervisory functions include (1) providing security to the self-service checkout terminal such as by observing the customers checkout transaction via a video connection, (2) collecting coupons or vouchers from customers, (3) accepting tendered checks from customers, (4) handling credit card verification exceptions, (5) itemizing items that the customer is unable to scan or otherwise enter, and (6) itemizing difficult items such as the identification of exotic produce and the like. Any one of the remote supervisor terminals 22 may monitor operation of any number or combination of the self-service checkout terminals 10 thereby enhancing the flexibility of the self-service retail system 100.

Figure 2:
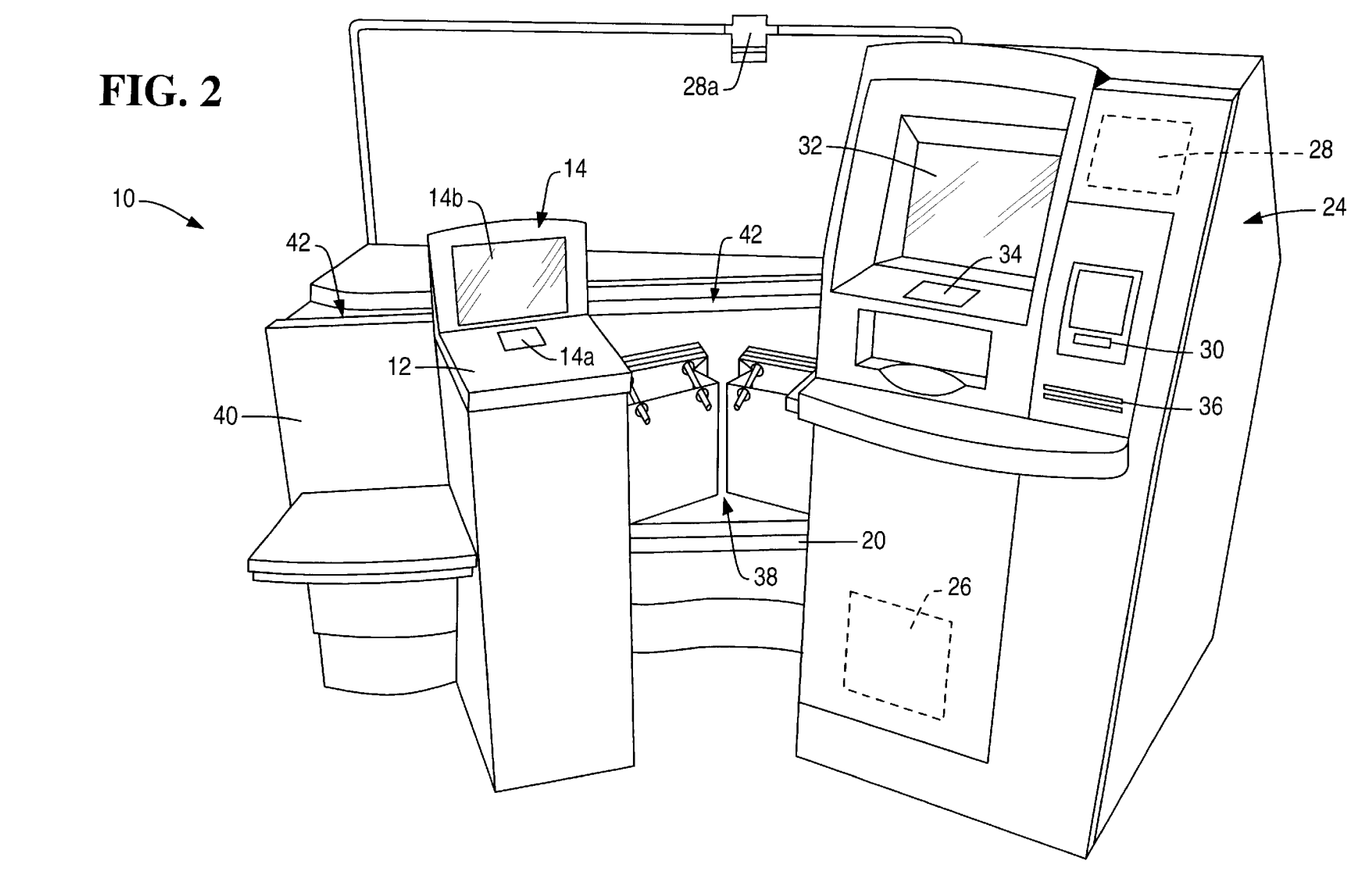
FIG. 2 is a perspective view of one of the self-service checkout terminals of the retail system of FIG. 1.

Referring now to FIG. 2, there is shown one of the self-service checkout terminals 10 of the retail system 100 in greater detail. The self-service checkout terminal 10 includes a product scale 12, a scanner 14, a bagwell scale 20, a video system 28, a card reader 30, a display monitor 32, a keypad 34, a printer 36, and a processing unit 26. The card reader 30, the display monitor 32, the keypad 34, and the printer 36 may be provided as separate components, or alternatively may preferably be provided as components of an automated teller machine (ATM) 24.

The self-service checkout terminal 10 also includes a bagwell 38 for accommodating one or more grocery bags and a base 40 having a counter 42 secured thereto. The counter 42 defines an arcuate surface as shown in FIG. 2. Such an arcuate surface allows the scanner 14 to be positioned relatively close or otherwise proximate the ATM 24 and hence the components associated therewith. Such a configuration facilitates a user's (e.g. customer's) use of the self-service checkout terminal 10. Moreover, the bagwell 38 is configured to allow two or more grocery bags to be accessed by the customer at any given time thereby allowing a customer to selectively load various item types into the grocery bags. For example, the customer may desire to use a first grocery bag for household chemical items such as soap or bleach, and a second grocery bag for edible items such as meat and produce.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14a and a second scanning window 14b. The first scanning window 14a is disposed in a substantially horizontal manner, whereas the second scanning window 14b is disposed in a substantially vertical manner, as shown in FIG. 2. The product scale 12 is integrated with the scanner 14. More specifically, the product scale 12 is disposed substantially parallel to the scanning window 14a thereby enveloping the scanning window 14a. If an item such as produce is placed upon the product scale 12 or the first scanning window 14a, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid code pattern. If a valid code pattern is present, the product identification code may then be utilized to retrieve product information associated with the item (e.g. the price of the item).

The display monitor 32 displays instructions which serve to guide a customer through a checkout procedure. For example, an instruction is displayed on the display monitor 32 which instructs the customer to enter an item into the self-service checkout terminal 10 by either passing the item over the scanner 14, or placing the item on the product scale 12 in order to obtain the weight of the item. Moreover, as described below in greater detail, an instruction is displayed on the display monitor 32 which instructs the customer to approach one of the remote supervisor terminals 22 if the customer requires intervention from the store employee (e.g. a retail clerk) operating the terminal 22 in order to complete his or her checkout transaction. The display monitor 32 is preferably a known touch screen monitor which can generate data signals when certain areas of the screen are touched by a customer.

The bagwell scale 20 is a weight scale which monitors the weight of items placed in the bagwell 38 (i.e. into a grocery bag) or onto the portion of the counter 42 which is located proximate the bagwell 38. It should be appreciated that a customer may place an item onto the portion of the counter 42 proximate the bagwell 38 subsequent to entering the item, but prior to placing the item into a grocery bag. For example, if a customer scans a loaf of bread, the customer may want to place the bread onto the portion of the counter 42 proximate the bagwell 38 until one of the grocery bags is nearly full thereby preventing the bread from being crushed. Hence, the bagwell scale 20 may be utilized to monitor the ingress and egress of items into and out of the bagwell 38 along with onto and off of the counter 42. Such monitoring is particularly useful for preventing items which have not been scanned from being placed into a grocery bag.

The video system 28 includes a video camera 28a, and is included in the self-service checkout terminal 10 to enhance the security thereof. In particular, the video system 28 is provided to capture video images relating to certain events during a customer's transaction. It should be appreciated that the video system 28 may track the manner in which a customer enters and thereafter handles items for entry. Moreover, such video images may include a video record of the customer himself or herself. Hence, it should be appreciated from the above discussion that the video system 28 may be configured to capture any event associated with a customer's operation of one of the self-service checkout terminal 10 as determined by a particular retailer.

The keypad 34 may include one or more of a known keypad or a touch pad. The keypad 34 and the touch screen associated with the display monitor 32 may be utilized to enter a code associated with a response to a given query displayed on the display monitor 32. Hence, the keypad 34 and the display monitor 32 define input devices which may be utilized to input a code associated with a response to a given query displayed on the display monitor 32 or otherwise presented to the customer operating the self-service checkout terminal 10. It should be appreciated that numerous other types of devices may also be utilized as input devices in order to fit the needs of a given self-service checkout terminal 10.

Figure 3:
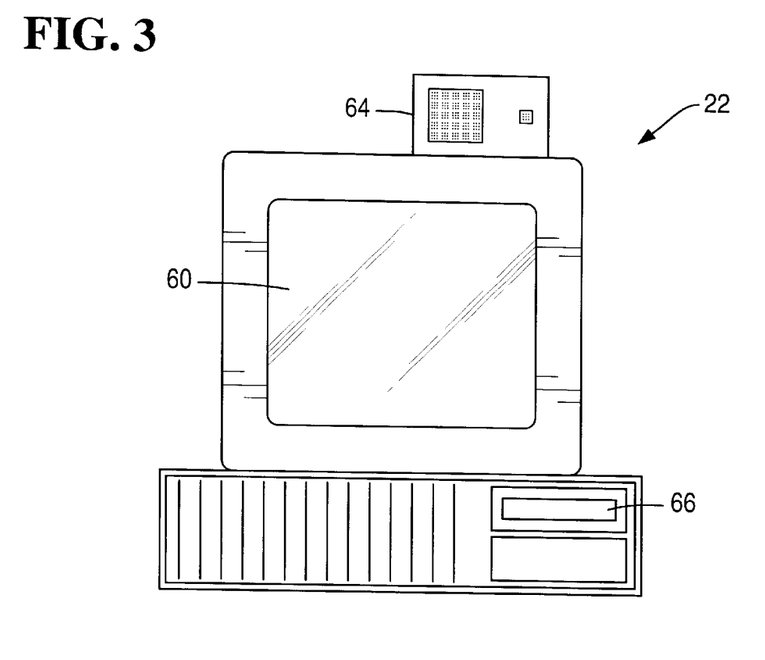
FIG. 3 is a perspective view of one of the remote supervisor terminals of the retail system of FIG. 1.

Referring now to FIG. 3, there is shown an exemplary supervisor terminal which may be utilized as the remote supervisor terminals 22 of the present invention. Each of the remote supervisor terminals 22 includes a display monitor 60, a speaker 64, and a printer 66. Each of the remote supervisor terminals 22 may be embodied as a separate "stand alone" terminal, or preferably, the functionality of the remote supervisor terminals 22 may be integrated with assisted checkout terminals (i.e. checkout terminals which are operated by a retail clerk). For example, the functionality of the remote supervisor terminals 22 may be integrated into assisted checkout terminals which are already in service or otherwise present in the retailer's store.

As with the display monitor 32, the display monitor 60 is preferably a known touch screen monitor which can generate data signals when certain areas of the screen are touched by the retail clerk operating the remote supervisor terminal 22. The touch screen is provided to allow the retail clerk operating the remote supervisor terminal 22 to enter a text message which may be displayed on one of the display monitors 32 associated with a particular self-service checkout terminal 10. Moreover, as discussed below in greater detail, if the customer operating one of the self-service checkout terminals 10 requires assistance or otherwise requests intervention, the retail clerk operating the remote supervisor terminal may touch a particular location or "button" on the touch screen associated with the remote supervisor terminal 22 in order to enter an acknowledgment code which causes a message to be displayed on the display monitor 32 of the self-service checkout terminal 10 thereby indicating to the customer that he or she may approach the remote supervisor terminal 22.

As described above, the retail clerk operating the remote supervisor terminal 22 may provide assistance to a customer operating one of the self-service checkout terminals 10. For example, if the customer indicates that he or she needs assistance in completing his or her checkout transaction by, for example, touching a particular key on the keypad 34 or touching a particular location on the touch screen of the display monitor 32, the retail clerk operating the supervisor terminal 22 may cause the customer's checkout transaction to be suspended and thereafter instruct the customer to approach the remote supervisor terminal 22. Moreover, if the customer operating the self-service checkout terminal 10 performs certain functions which require intervention, even if the customer doesn't affirmatively request such intervention, the retail clerk operating the supervisor terminal 22 may likewise cause the customer's checkout transaction to be suspended and thereafter instruct the customer to approach the remote supervisor terminal 22. For example, the retail clerk operating the remote supervisor terminal 22 may be required to intervene in the customer's transaction to enter the customer's coupons if the customer attempts to enter coupons into the self-service checkout terminal 10 (unless the self-service checkout terminal 10 is equipped with a coupon acceptor). It should therefore be appreciated that the customer may require assistance or otherwise request intervention for such reasons as, for example, (1) collection of coupons, (2) acceptance of tendered checks, (3) handling of credit card verification exceptions, and (4) itemization of items that the customer is unable to scan or otherwise enter.

The self-service retail system 100 of the present invention is configured such that retail personnel operating the remote supervisor terminal 22 (e.g. a retail clerk) may provide the necessary customer assistance while also providing security from improprieties such as theft. In particular, in response to a customer performing a function which requires intervention, or alternatively, a customer's affirmative request for intervention, an initial message is displayed on the display monitor 60 of the remote supervisor terminal 22. Such a message informs the retail clerk operating the terminal 22 that the customer is in need of intervention into his or her checkout transaction. Thereafter, once the retail clerk operating the remote supervisor terminal 22 has determined that he or she is prepared to render assistance to the customer, he or she may enter a code via use of the touch screen associated with the display monitor 60 which causes the customer's transaction to be halted or otherwise suspended. In response to suspension of the customer's transaction, a temporary receipt is printed by the printer 36 of the self-service checkout terminal 10. Such a temporary receipt includes a bar code or other machine readable code which contains indicia that is utilized by the retail clerk operating the remote supervisor terminal 22 to resume the customer's transaction once the customer has approached the remote supervisor terminal 22.

Once the customer's transaction has been resumed at the remote supervisor terminal 22, the retail clerk assists the customer in order to complete the customer's transaction. For example, the retail clerk may (1) collect and credit the customer's coupons, (2) accept and approve the customer's personal check, (3) handle a credit card verification exception, or (4) itemize (i.e. enter) any items that the customer was unable to scan or otherwise enter. Once the customer has tendered payment for his or her items for purchase, a final receipt (e.g. a receipt which includes an itemized list of the customer's items for purchase and coupons, and a transaction total) is printed with the printer 66 of the remote supervisor terminal 22 thereby completing the customer's transaction.

Figure 4:
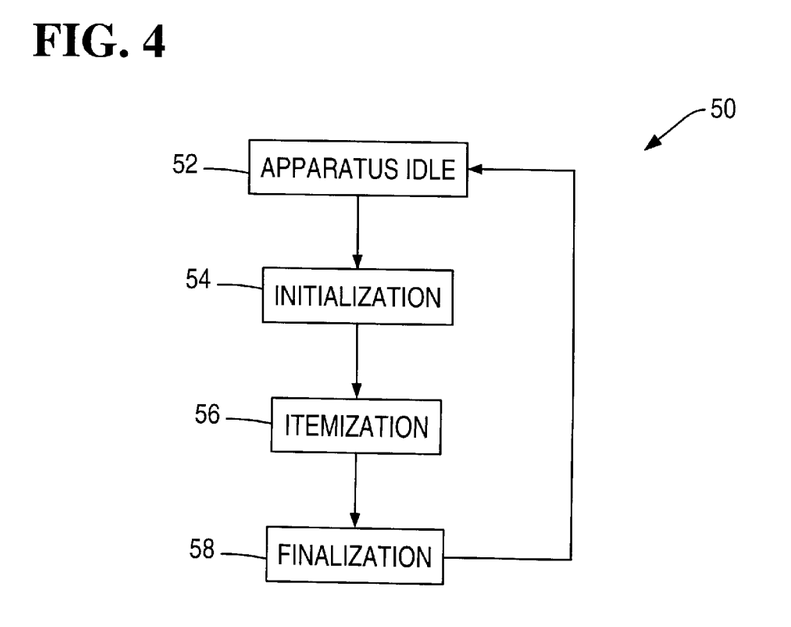
FIG. 4 is a flowchart setting forth a general procedure for checking out items through the self-service checkout terminal of FIG. 1.

In order to demonstrate the above-described process in more detail, FIG. 4 shows a flowchart which sets forth a general procedure 50 for checking out items through one of the self-service checkout terminals 10. It should be appreciated that when the customer arrives at the self-service checkout terminal 10, the terminal 10 is in an idle state (step 52). An initialization step 54 is executed prior to checking out items for purchase. In particular, one or more initialization instructions are displayed on the display monitor 32 which instruct the customer to (1) touch a particular area of the display monitor 32 or push a particular button on the keypad 34 in order to select a desired method of payment, and/or (2) identify himself or herself by inserting a loyalty card, debit card, credit card, or smart card into the card reader 30.

At the completion of the initialization step 54, the routine 50 advances to an itemization step 56 where the customer enters individual items for purchase by scanning the items across the scanner 14. Moreover, in step 56, the customer may enter items, such as produce items or the like, by weighing the items with the product scale 12, and thereafter entering a product lookup code associated with the item via either the keypad 34 or by touching a particular area of the display monitor 32. Further, in step 56 the customer may enter an item by manually entering the product identification code associated with the item via use of the keypad 34. Such manual entry of an item may be necessary for items (which would otherwise be entered via the scanner 14) if the product identification code printed on the item is not readable by the scanner 14 or if the item is too large or bulky to be scanned with the scanner 14. It should be appreciated that the self-service checkout terminal 10 may be configured such that the routine 50 allows experienced customers to bypass the initialization step 54 thereby advancing directly to the itemization step 56. In such a configuration, the experienced customer would begin the transaction by scanning or otherwise entering his or her first item for purchase.

At the completion of the itemization step 56, the routine 50 advances to a finalization step 58 in which (1) a grocery receipt is printed by the printer 36, and (2) payment is tendered by either inserting currency into a cash acceptor (not shown), charging a credit card or debit card account, or decreasing a value amount stored on a smart card via the card reader 30. It should be appreciated that in the case of when a customer inserts currency into the cash acceptor, the self-service checkout terminal 10 may provide change via a currency dispenser (not shown) and a coin dispenser (not shown). After completion of the finalization step 58, the routine 50 returns to step 52 in which the self-service checkout terminal 10 remains in the idle condition until a subsequent customer initiates a checkout procedure.

Figure 5:
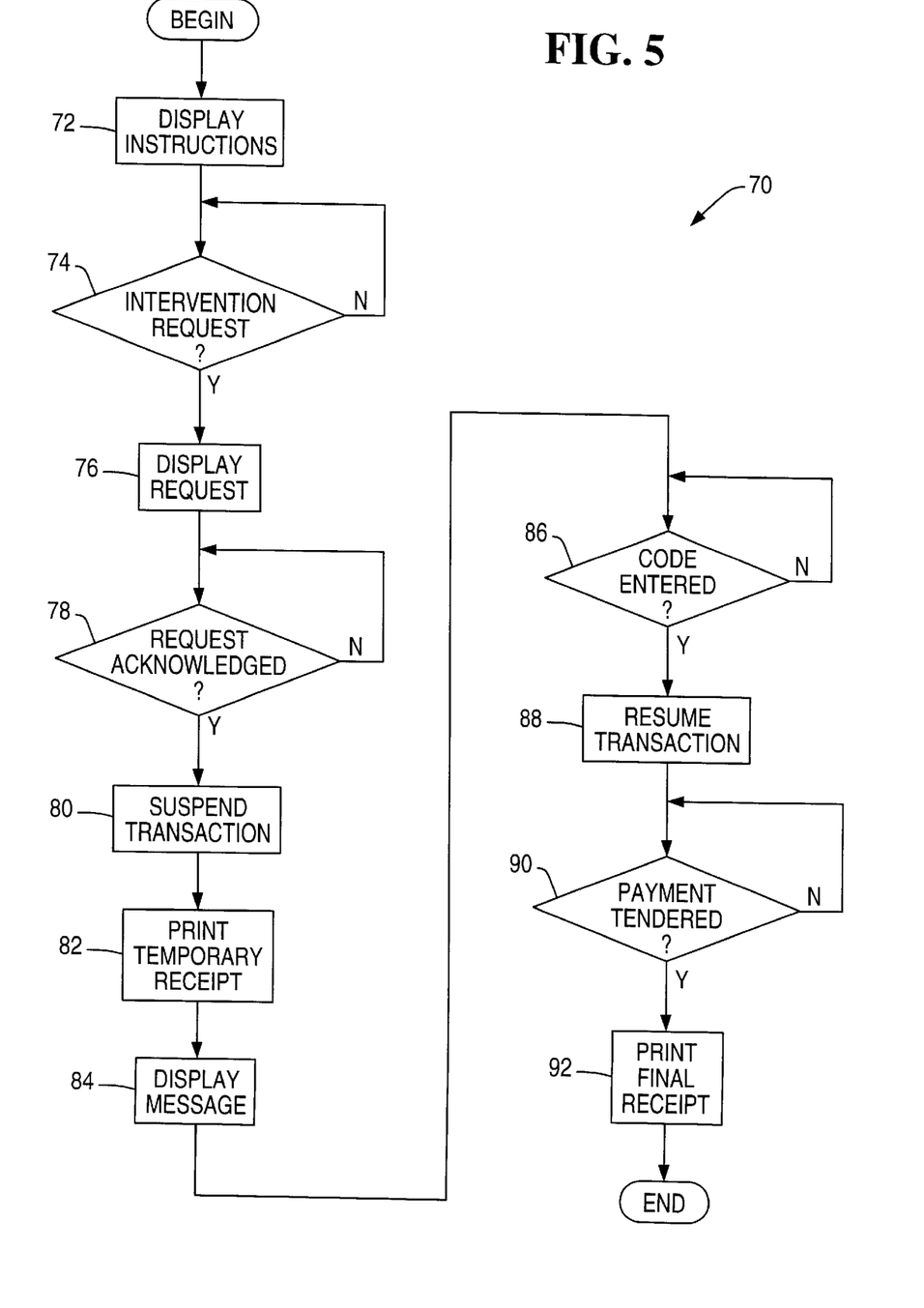
FIG. 5 is a flowchart setting forth a procedure for providing assistance to a customer during operation of the self-service checkout terminal of FIG. 1.

However, during such operation of the self-service checkout terminal 10, the customer may require intervention from the retail clerk operating the remote supervisor terminal 22 in order to complete his or her checkout transaction. Accordingly, there is shown in FIG. 5 a flow chart which sets forth a procedure or routine 70 for intervening into the customer's checkout transaction. As discussed above, intervention into the customer's transaction may be necessary as a result of (1) the customer performing a function (e.g. attempting to enter coupons) which automatically requires intervention by the retail clerk operating the remote supervisor terminal 22, or (2) the customer touching a particular area of the touch screen associated with the display monitor 32 if the customer is having difficulty or is otherwise in need of assistance. Therefore, the intervention routine 70 begins with step 72 in which a message is displayed on the display monitor 32 of the self-service checkout terminal 10 which instructs the customer to touch a particular key on the keypad 34 or a particular area of the touch screen of the display monitor 32 if the customer requires intervention from the retail clerk operating the remote supervisor terminal 22. As described above, the customer may request intervention or otherwise require assistance for such reasons as, for example, (1) redemption of the customer's coupons, (2) the customer desires to tender payment with a personal check, (3) the customer requires a credit card verification exception, or (4) the customer is unable to scan or otherwise enter one or more of his or her items for purchase. It should be appreciated that the instructional message of step 72 may displayed in a corner section or the like of the display monitor 32 during the customer's entire checkout transaction.

The routine 70 then advances to step 74 in which the processing unit 26 associated with the self-service checkout terminal 10 monitors output from the keypad 34 and the display monitor 32 in order to determine whether the customer has entered a request for intervention. In particular, as described above in regard to step 72, a message is displayed on the display monitor 32 instructing the customer to touch a particular touch screen area of the display monitor 32, or to touch a particular key associated with the keypad 34, if the customer is in need of intervention from the retail clerk operating the remote supervisor terminal 22. If a particular output is detected from either the keypad 34 or the display monitor 32, the processing unit 26 associated with the self-service checkout terminal 10 determines that the customer has requested intervention from the retail clerk operating the remote supervisor terminal 22, an intervention-needed control signal is generated, and the routine 70 advances to step 76. If a particular output is not detected from either the keypad 34 or the display monitor 32, the processing unit 26 associated with the self-service checkout terminal 10 determines that the customer does not currently require intervention from the retail clerk, and the routine 70 loops back to step 74 to monitor for subsequent intervention requests.

In step 76, a message is displayed on the display monitor 60 of one of the remote supervisor terminals 22 which informs the retail clerk operating the remote supervisor terminal 22 that the customer's transaction is in need of intervention. Once the message has been displayed, the routine 70 advances to step 78.

In step 78, the processing unit associated with the remote supervisor terminal 22 monitors output from the touch screen associated with the display monitor 60 in order to determine whether the retail clerk has entered a code indicative of an acknowledgment of the customer's request for intervention. It should be noted that the retail clerk operating the remote supervisor terminal 22 may not immediately acknowledge the customer's request for intervention. For example, if a large queue of other customers has already formed at the remote supervisor terminal 22, the retail clerk operating the terminal 22 may opt to delay acknowledgment of the customer's intervention request until the queue has shortened. It should be appreciated that by waiting for the queue to shorten, the retail clerk will be better able to observe the movement of the customer as he or she approaches the remote supervisor terminal 22 thereby reducing the likelihood that the customer either intentionally or unintentionally exits the store without paying for his or her items for purchase. Hence, if a particular output is detected from the touch screen associated with display monitor 60, the processing unit associated with the remote supervisor terminal 22 determines that the retail clerk has acknowledged the customer's request for intervention, a request-acknowledged control signal is generated, and the routine 70 advances to step 80. If a particular output is not detected from the touch screen associated with display monitor 60, the processing unit associated with the remote supervisor terminal 22 determines that the retail clerk has not yet acknowledged receipt of the customer's request for intervention, and the routine 70 loops back to step 78 to await such acknowledgment.

In step 80, the customer's checkout transaction is suspended. In particular, the self-service checkout terminal 10 is operated such that the customer is prevented from performing any further operations therewith. For example, the customer is prevented from entering additional items in the terminal 10, using a credit card, or any other operation associated with his or her checkout transaction. It should be appreciated that such suspension of the customer's checkout transaction places the self-service checkout terminal 10 in its idle state (see step 52 of FIG. 4) thereby rendering the terminal 10 ready to commence a subsequent customer's checkout transaction. The routine 70 then advances to step 82.

In step 82, the processing unit 26 associated with the self-service checkout terminal 10 causes a temporary receipt to be printed with the printer 36. In particular, a temporary receipt is printed which includes a bar code or other type of machine readable code which corresponds to an electronic file stored on a server (not shown) or the like of the retailer's network. Such an electronic file includes the retail data (e.g. itemized list of entered items, vouchers, etc.) of the customer's suspended checkout transaction. Thereafter, the routine 70 advances to step 84.

In step 84, a message is displayed on the display monitor 32 which instructs the customer to collect his or her items for purchase, along with his or her temporary receipt, and thereafter approach or otherwise advance to the remote supervisor terminal 22. In particular, the customer is instructed to approach the remote supervisor terminal 22 so that the retail clerk operating the terminal 22 can assist the customer in order to complete his or her checkout transaction. The routine 70 then advances to step 86.

In step 86, the processing unit associated with the remote supervisor terminal 22 determines if the customer has approached the remote supervisor terminal 22. In particular, once the customer approaches the remote supervisor terminal 22 and thereafter gives his or her temporary receipt to the retail clerk operating the remote supervisor terminal 22, the clerk operates a hand-held scanner (not shown) or the like so as to read the bar code printed on the customer's temporary receipt. As discussed above, the functionality of the remote supervisor terminal 22 may be integrated with an assisted checkout terminal (not shown) included in the retailer's operation. Hence, in step 86, the bar code printed on the customer's temporary receipt may be scanned with the product scanner of the assisted checkout terminal. In any event, if the bar code is read from the customer's temporary receipt, the routine 70 advances to step 88. If the bar code has not yet been read from the temporary receipt, the routine 70 loops back to step 86 to await entry of the bar code from the customer's temporary receipt.

In step 88, the retail clerk operating the remote supervisor terminal 22 resumes the customer's checkout transaction. In particular, the successful reading of the bar code from the customer's temporary receipt causes the electronic file associated with the customer's checkout transaction to be retrieved from the server (not shown) of the retailer's network 25 such that the retail clerk may resume the customer's checkout transaction at the remote supervisor terminal 22. During such resumption of the customer's transaction, the retail clerk may (1) collect and credit the customer's coupons, (2) accept and approve the customer's personal check, (3) handle a credit card verification exception, or (4) itemize (i.e. enter) any items that the customer was unable to scan or otherwise enter. Once the customer's checkout transaction has been resumed, the routine 70 advances to step 90.

In step 90, the processing unit associated with the remote supervisor terminal 22 determines if the customer has tendered payment for his or her items for purchase. In particular, once the customer has tendered payment for his or her items for purchase by (1) paying with his or her credit, debit, or smart card, (2) tendering cash to either a cash acceptor device or the retail clerk, or (3) tendering a personal check (which was approved by the retail clerk), a payment-tendered control signal is generated and the routine 70 advances to step 92. If the customer has not yet tendered payment for his or her items for purchase, the routine 70 loops back to step 90 to monitor for subsequent payment.

In step 92, the remote supervisor terminal 22 operates the printer 66 so as to generate a final receipt for the customer. It should be appreciated that the final receipt includes, for example, an itemized list of the customer's items for purchase along with a total dollar amount of the customer's items for purchase. Thereafter, the routine 70 then ends thereby allowing the customer to exit the store with his or her items for purchase.

As described above, the self-service retail system 100 of the present invention provides numerous advantages over retail systems which have heretofore been designed. For example, by providing a process by which customers that require intervention are systematically advanced to the remote supervisor terminal 22, the number of occasions in which a customer intentionally or inadvertently exits the retailer's store without paying for his or her items for purchase is reduced. For instance, since the retail clerk operating the remote supervisor terminal 22 will only acknowledge the customer's intervention request if the queue at the terminal 22 is below a manageable limit, the retail clerk is able to manually track or otherwise watch the customer as he or she advances to the remote supervisor terminal 22 in order to ensure that the customer doesn't exit the store on his or her way to the terminal 22.

Moreover, by suspending the customer's checkout transaction and allowing the customer to complete his or her transaction at the remote supervisor terminal 22, the self-service checkout terminal 10 which was being utilized by the customer is made available for use by subsequent customers. Such a configuration enhances the throughput and efficiency of the self-service checkout terminals 10.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

There are a plurality of advantages of the present invention arising from the various features of the retail system described herein. It will be noted that alternative embodiments of the retail system of the present invention may not include all of the features described yet still benefit from at least some of the advantages of such features. Those of ordinary skill in the art may readily devise their own implementations of a retail system that incorporate one or more of the features of the present invention and fall within the spirit and scope of the present invention as defined by the appended claims.

What is claimed is:

1. A method of operating a retail system which includes (i) a self-service checkout terminal, and (ii) a remote supervisor terminal, comprising the steps of:

generating an intervention-needed control signal with said self-service checkout terminal if a user of said self-service checkout terminal inputs a first code in a first input device associated with said self-service checkout terminal which indicates that said user requests intervention from retail personnel operating said remote supervisor terminal during a checkout transaction;

transmitting said intervention-needed control signal to said remote supervisor terminal;

generating a first message which informs said retail personnel operating said remote supervisor terminal that said user of said self-service checkout terminal requests intervention in response to receipt of said intervention-needed control signal;

generating a request-acknowledged control signal with said remote supervisor terminal if said retail personnel operating said remote supervisor terminal inputs a second code in a second input device associated with said remote supervisor terminal which indicates that said retail personnel desires for said user to complete said checkout transaction of said user at said remote supervisor terminal; and suspending said checkout transaction of said user in response to generation of said request-acknowledged control signal.

2. The method of claim 1, further comprising the step of:

generating a message which instructs said user to complete said checkout transaction at said remote supervisor terminal in response to generation of said request-acknowledged control signal.

3. The method of claim 1, further comprising the step of:

resuming said checkout transaction of said user at said remote supervisor terminal, wherein said resuming step is performed subsequent to said suspending step.

4. The method of claim 3, wherein said step of suspending said checkout transaction of said user includes the step of printing a first receipt with a first printer which is associated with said self-service checkout terminal.

5. The method of claim 4, wherein:

said resuming step includes the step of operating said remote supervisor terminal so as to allow said user to tender payment for a number of items for purchase associated with said checkout transaction of said user, and said step of operating said remote supervisor terminal so as to allow said user to tender payment includes the step of printing a second receipt with a second printer which is associated with said remote supervisor terminal.

6. A method of carrying out a checkout transaction with a retail system which includes (i) a self-service checkout terminal, and (ii) a remote supervisor terminal, comprising the steps of:

entering items into said self-service checkout terminal by a user of said self-service checkout terminal;

generating an intervention-needed control signal with said self-service checkout terminal in response to entry of an intervention request into said self-service checkout terminal by said user;

displaying a first visual message on a first display monitor of said remote supervisor terminal in response to generation of said intervention-needed control signal, said first visual message informing an operator of said remote supervisor terminal that said user of said self-service checkout terminal has entered said intervention request into said self-service checkout terminal;

generating a request-acknowledged control signal with said remote supervisor terminal in response to entry of an intervention request acknowledgement into said remote supervisor terminal by said operator of said remote supervisor terminal, whereby said operator initiates generation of said request-acknowledged control signal;

displaying a second visual message on a second display monitor of said self-service checkout terminal in response to generation of said request-acknowledged control signal, said second visual message instructing said user of said self-service checkout terminal to complete said checkout transaction at said remote supervisor terminal;

printing a temporary receipt with a first printer of said self-service checkout terminal in response to generation of said request-acknowledged control signal, said temporary receipt including a machine readable code which corresponds to items entered into said self-service checkout terminal during said self-service entering step; and scanning said machine readable code of said temporary receipt with a scanner of said remote supervisor terminal;

entering items into said remote supervisor terminal after said scanning step by said operator of said remote supervisor terminal; and printing a final receipt with a second printer of said remote supervisor terminal after said remote supervisor entering step.

7. A method of carrying out a checkout transaction with a retail system which includes (i) a self-service checkout terminal, and (ii) a remote supervisor terminal, comprising the steps of:

entering items into said self-service checkout terminal by a user of said self-service checkout terminal;

generating an intervention-needed control signal with said self-service checkout terminal in response to entry of an intervention request into said self-service checkout terminal by said user;

displaying a visual message on a display monitor of said remote supervisor terminal in response to generation of said intervention-needed control signal, said visual message informing an operator of said remote supervisor terminal that said user of said self-service checkout terminal has entered said intervention request into said self-service checkout terminal;

generating a request-acknowledged control signal with said remote supervisor terminal in response to entry of an intervention request acknowledgement into said remote supervisor terminal by said operator of said remote supervisor terminal, whereby said operator initiates generation of said request-acknowledged control signal;

printing a temporary receipt with a printer of said self-service checkout terminal in response to generation of said request-acknowledged control signal, said temporary receipt including a machine readable code which corresponds to items entered into said self-service checkout terminal during said self-service entering step; and scanning said machine readable code of said temporary receipt with a scanner of said remote supervisor terminal;

entering items into said remote supervisor terminal after said scanning step by said operator of said remote supervisor terminal.

8. A method of carrying out a checkout transaction with a retail system which includes (i) a self-service checkout terminal, and (ii) a remote supervisor terminal, comprising the steps of:

entering items into said self-service checkout terminal by a user of said self-service checkout terminal;

generating an intervention-needed control signal with said self-service checkout terminal in response to entry of an intervention request into said self-service checkout terminal by said user;

displaying a first visual message on a first display monitor of said remote supervisor terminal in response to generation of said intervention-needed control signal, said first visual message informing an operator of said remote supervisor terminal that said user of said self-service checkout terminal has entered said intervention request into said self-service checkout terminal;

generating a request-acknowledged control signal with said remote supervisor terminal in response to entry of an intervention request acknowledgement into said remote supervisor terminal by said operator of said remote supervisor terminal, whereby said operator initiates generation of said request-acknowledged control signal;

displaying a second visual message on a second display monitor of said self-service checkout terminal in response to generation of said request-acknowledged control signal, said second visual message instructing said user of said self-service checkout terminal to complete said checkout transaction at said remote supervisor terminal; and entering items into said remote supervisor terminal after said second visual message displaying step by said operator of said remote supervisor terminal.

9. A method of carrying out a checkout transaction with a retail system which includes (i) a self-service checkout terminal, and (ii) a remote supervisor terminal, comprising the steps of:

entering items into said self-service checkout terminal;

generating an intervention-needed control signal with said self-service checkout terminal in response to entry of an intervention request into said self-service checkout terminal;

generating an intervention request message with said remote supervisor terminal in response to generation of said intervention-needed control signal;

generating a request-acknowledged control signal with said remote supervisor terminal in response to entry of an intervention request acknowledgement into said remote supervisor terminal by an operator of said remote supervisor terminal, whereby said operator initiates generation of said request-acknowledged control signal; and printing a temporary receipt with said self-service checkout terminal in response to generation of said request-acknowledged control signal, said temporary receipt including a machine readable code which corresponds to items entered into said self-service checkout terminal during said self-service entering step.

10. The method of claim 9, wherein:

said remote supervisor terminal includes a display monitor, and said intervention request message generating step includes the step of displaying a visual message on said display monitor which informs an operator of said remote supervisor terminal that a user of said self-service checkout terminal has entered an intervention request into said self-service checkout terminal.

11. The method of claim 9, further comprising the step of generating an acknowledgement message with said self-service checkout terminal in response to generation of said request-acknowledged control signal.

12. The method of claim 11, wherein:

said self-service checkout terminal includes a display monitor, and said intervention request message generating step includes the step of displaying a visual message on said display monitor which instructs a user of said self-service checkout terminal to complete said checkout transaction at said remote supervisor terminal.

13. The method of claim 9, further comprising the step of scanning said machine readable code with a scanner of said remote supervisor terminal after said printing step.

14. The method of claim 13, further comprising the step of entering items into said remote supervisor terminal after said scanning step.

15. A method of carrying out a checkout transaction with a retail system which includes (i) a self-service checkout terminal, and (ii) a remote supervisor terminal, comprising the steps of:

generating an intervention-needed control signal with said self-service checkout terminal in response to entry of an intervention request into said self-service checkout terminal;

generating an intervention request message with said remote supervisor terminal in response to generation of said intervention-needed control signal;

generating a request-acknowledged control signal with said remote supervisor terminal in response to entry of an intervention request acknowledgement into said remote supervisor terminal by an operator of said remote supervisor terminal, whereby said operator initiates generation of said request-acknowledged control signal; and printing a temporary receipt with said self-service checkout terminal in response to generation of said request-acknowledged control signal.

16. The method of claim 15, wherein:

said remote supervisor terminal includes a display monitor, and said intervention request message generating step includes the step of displaying a visual message on said display monitor which informs an operator of said remote supervisor terminal that a user of said self-service checkout terminal has entered an intervention request into said self-service checkout terminal.

17. The method of claim 15, further comprising the step of generating an acknowledgement message with said self-service checkout terminal in response to generation of said request-acknowledged control signal.

18. The method of claim 17, wherein:

said self-service checkout terminal includes a display monitor, and said intervention request message generating step includes the step of displaying a visual message on said display monitor which instructs a user of said self-service checkout terminal to complete said checkout transaction at said remote supervisor terminal.

19. The method of claim 15, wherein said temporary receipt includes a machine readable code which corresponds to items enter into said self-service checkout terminal during said checkout transaction, further comprising the step of:

scanning said machine readable code with a scanner of said remote supervisor terminal.

20. The method of claim 19, further comprising the step of entering items into said remote supervisor terminal after said scanning step.

21. The method of claim 15, further comprising the step of suspending said checkout transaction in response to generation of said request-acknowledged control signal.

22. The method of claim 21, further comprising the step of resuming said checkout transaction at said remote supervisor terminal after said suspending step.

23. The method of claim 22, wherein said resuming step includes the step of operating said remote supervisor terminal so as to allow a customer to tender payment for a number of items for purchase associated with said checkout transaction.

24. The method of claim 23, wherein said step of operating said remote supervisor terminal so as to allow said user to tender payment includes the step of printing a final receipt with said remote supervisor terminal.

* * * * *